US006517939B1

(12) United States Patent
Moini et al.

(10) Patent No.: US 6,517,939 B1
(45) Date of Patent: Feb. 11, 2003

(54) NOBLE METAL COATED SUBSTRATE PIGMENTS

(75) Inventors: Ahmad Moini, Princeton, NJ (US); Daniel S. Fuller, Beacon, NY (US); Alfred E. Kober, Kapaau, HI (US); Curtis J. Zimmermann, Cold Spring, NY (US)

(73) Assignee: Engelhard Corporation, NJ (US)

( * ) Notice: Subject to any disclaimer, the term of this patent is extended or adjusted under 35 U.S.C. 154(b) by 0 days.

(21) Appl. No.: 09/390,148

(22) Filed: Sep. 3, 1999

(51) Int. Cl.⁷ ................................. B32B 5/16
(52) U.S. Cl. ............... 428/402; 428/403; 428/404; 428/405; 428/406; 428/407; 428/426; 428/429; 428/434; 427/123; 427/125; 427/126.1; 427/126.2; 427/126.5; 427/384; 427/387; 427/407.1
(58) Field of Search ........................ 428/402, 403, 428/404, 405, 406, 434, 407, 426, 429; 427/123, 125, 126.1, 126.2, 126.5, 384, 387, 407.1

(56) References Cited

U.S. PATENT DOCUMENTS

| 3,087,828 A | 4/1963 | Linton | 106/417 |
|---|---|---|---|
| 3,087,829 A | 4/1963 | Linton | 106/417 |
| 4,287,253 A | 9/1981 | Leech | 428/323 |
| 4,374,158 A | 2/1983 | Taniguchi et al. | 427/536 |
| 4,483,887 A | 11/1984 | Garcia | 427/436 |
| 5,064,791 A | * 11/1991 | Ohtsuka | 501/147 |
| 5,470,616 A | 11/1995 | Uenishi et al. | 427/515 |
| 5,624,486 A | * 4/1997 | Schmid | 106/404 |
| 5,707,436 A | * 1/1998 | Fritsche | 106/403 |
| 5,731,091 A | 3/1998 | Schmidt et al. | 428/428 |
| 5,753,371 A | 5/1998 | Sullivan et al. | 428/406 |

FOREIGN PATENT DOCUMENTS

| EP | 0353544 | 7/1989 |
|---|---|---|
| EP | 0501139 | 1/1992 |
| EP | 0832943 A3 | 9/1997 |
| EP | 0832943 A2 | 9/1997 |
| EP | 1082952 A1 | 7/2000 |

OTHER PUBLICATIONS

Journal of the Chemical Society; vol. 75; "Interaction of Nitric Oxide with Silver Nitrate"; Edward Divers; pp. 83–85; 1899.

* cited by examiner

Primary Examiner—Leszek Kiliman
(74) Attorney, Agent, or Firm—Dickstein, Shapiro, Morin & Oshinsky, LLP.

(57) ABSTRACT

A silver/gold coated laminar substrate pearlescent product is improved by incorporating rhodium in an amount of up to about 2% into the coating and/or by overcoating with a silane in an amount of up to about 5%.

20 Claims, 1 Drawing Sheet

NOBLE METAL COATED SUBSTRATE PIGMENTS

BACKGROUND OF THE INVENTION

Pearlescent or luster pigments are used in automotive coatings, decorative coatings, plastic articles, paint, printing, inks, cosmetics and the like.

Pearlescent pigments based on laminar substrates such as mica which have been coated with a metal oxide are known. As a result of reflection and refraction of light, these pigments exhibit a pearl-like luster. Also depending on the thickness of the metal oxide layer, they can also exhibit interference color effects. A description of such pigments can be found, for example, in U.S. Pat. Nos. 3,087,828 and 3,087,829.

The pearlescent pigments most frequently encountered on a commercial basis are titanium dioxide-coated mica and iron oxide-coated mica pearlescent pigments. The oxide coating is in the form of a thin film deposited on the surface of the mica particle. The resulting pigment has the optical properties of thin films and thus the color reflected by the pigment arises from light interference which is dependent on the thickness of the coating.

Other metal oxide coatings and/or laminar substrates can also be employed. For example, U.S. Pat. No. 5,753,371 describes pearlescent pigments which are metal oxide-coated glass. Similarly, luster pigments in which a metal or metal alloy such as silver, gold and silver-gold alloys are coated on a laminar substrate such as mica or titanium dioxide-coated mica or other substrates are described in U.S. Pat. No. 5,624,486.

All such pigments achieve their optical effect based on the directed reflection and refraction of light at predominantly sheet-like, mutually parallel-oriented, metallic or reflective pigment particles. As a result, the quality of a pigment is generally dependent on the smoothness or continuousness of the coating on the substrate particle. The quality of the pigment will decrease rapidly with increasing the discontinuities in the coating. For example, silver and/or gold coatings on a particulate laminar substrate have been found to preferentially form blade-shaped metal crystals which overlap with one another on the exterior surface of the coating. As a result, the quality of the pigment suffers even if some non-decorative quality may be enhanced.

In addition, the formation of metal oxide-coated mica (or other substrates) as well as the formation of the silver and/or gold coatings on the substrates often involve the use of a material containing chlorine. For example, formation of a titanium dioxide-coated mica (for use as a substrate on which another layer is formed) often involves the use of titanium tetrachloride as a reagent and/or control of pH during the process through the use of hydrochloric acid. It has been found that the presence of even very small concentrations of aqueous chloride cause the silver and gold coatings on a particulate substrate to disintegrate. The possible presence of residual chlorine means that care must be taken in completely removing reagents employed in the process and/or the resulting silver/gold coated pigments must be maintained in a non-aqueous environment.

It is accordingly the object of the present invention to provide a product in which the silver or gold coating on a laminar substrate is substantially smooth and continuous or the product contains a barrier which protects the coating from degradation by aqueous chloride or, preferably, both. These and other objects of the invention will become apparent to those of ordinary skill in this art from the following detailed description.

SUMMARY OF THE INVENTION

The present invention relates to an improved noble metal coated laminar substrate in which the coating contains a small amount of rhodium and/or there is a silane overcoating on the noble metal coating.

DESCRIPTION OF THE INVENTION

Figure 1:
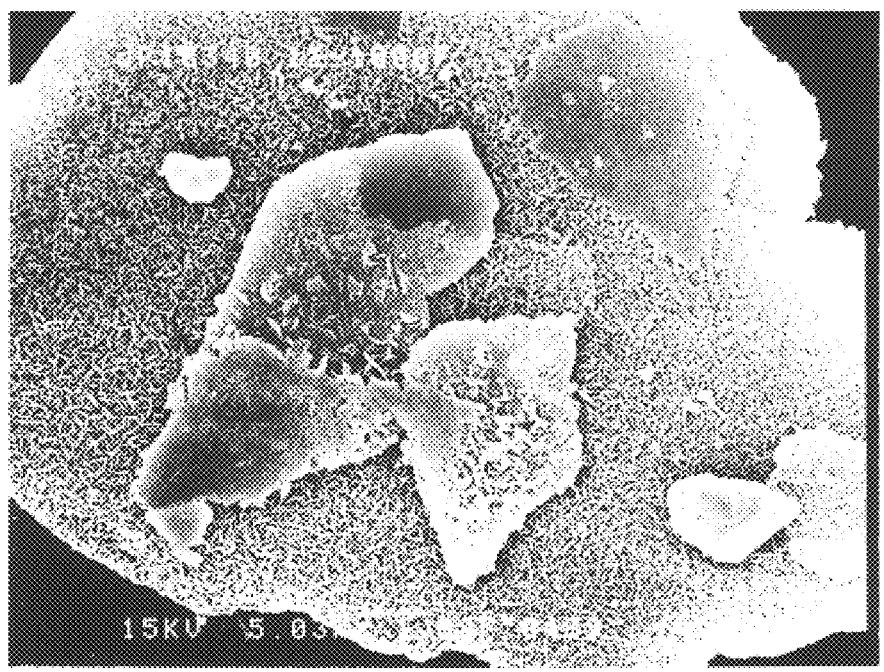
FIG. 1 is a photomicrograph of the surface of a pearlescent pigment formed in Example 1 below.

In accordance with the present invention, a silver or gold containing coating is formed on a laminar substrate in any convenient manner. Any of the laminar substrates utilized heretofore for pearlescent pigments can be used in the present invention. Suitable substrates include mica, talc, glass, kaolin and the like. The substrate can also be in the form of a metal oxide-coated substrate, e.g. mica or glass or the like, such as titanium dioxide-coated micas and iron oxide-coated micas, or can be bismuth oxychloride or platy iron oxide. Such products are available commercially.

The silver or gold layer can be applied to the laminar substrate in any suitable fashion. Preferably, these coatings are obtained by reduction from a suitable metal salt solution. Alloys of silver and gold can also be applied by reaction of a metal salt solution. The particular salt and the solvent for the salt is not restricted and any convenient material can be used as long as it does not adversely effect the laminar substrate. Aqueous solutions are convenient. Also, because of its availability, silver nitrate solutions are preferred in the case of silver.

More uniform and continuous silver/gold coatings can be obtained when a small amount of up to about 2% by weight of rhodium based on the weight of the coating is additionally employed. Preferably, the rhodium is employed in an amount of about 0.5% to 1%. The rhodium can be deposited in any convenient fashion, preferably by contacting the substrate with a rhodium-containing solution. The only qualification of the solvent is that it does not detrimentally effect the substrate. The silver/gold coating solution and the rhodium coating solution may be applied sequentially in either order or a single coating solution containing both agents can be combined with the laminar substrate. Any rhodium salt or complex which is soluble in the silver/gold coating solution can be employed. It is most convenient to use a rhodium salt whose anion is the same as the anion in the coating solution. For example, if the coating solution contains silver nitrate, it is convenient to use rhodium nitrate.

The coated substrate is recovered from the coating solution by any convenient means such as filtration and washed to remove reagent with, for example, water. Alternatively, recovery can be done by evaporating water. The resulting solid material is then dried and, if desired, calcined.

The susceptibility of the silver/gold coating to deterioration and degradation by aqueous chloride is substantially lessened or prevented by overcoating the silver/gold coating with a thin layer of what is generally known as a hydrolyzed silane coupling agent or a mixture of such agents. These, as known, are compounds which act as an interface between an organic material and an inorganic material to enhance the affinity between the two (although they are not functioning in that fashion in the present case as there is only a metal surface). Such silane coupling agents generally have both an organo functional group and a hydrolyzable functional group bonded either directly or indirectly to silicon. The hydrolyzable functional groups are generally alkoxy groups and preferably $C_{1-4}$ alkoxy groups.

Examples of silane coupling agents which can be used in the present invention are gamma-(2-aminoethyl) aminopropyltrimethoxysilane, aminopropyltrimethoxysilane, gamma-aminopropyl triethoxy silane, gamma-(2-aminoethyl) aminopropylmethyldimethoxysilane, gamma-methacryloxypropylmethyldimethoxysilane, gamma-methacyyloxypropyltrimethoxysilane, gamma-glycidoxypropyltrimethoxysilane, gamma-mercaptopropyltrimethoxysilane, vinyltriacetoxysilane, gamma-chloropropyltrimethoxysilane, vinyltrimethoxysilane, octadecyldimethyl-[3-(trimethoxysilyl)-propyl] ammonium chloride, gamma-mercaptopropyl-methyl-dimethoxy silane, methyltrichlorosilane, dimethyl-dichlorosilane, trimethylchlorosilane, gamma-isocyanatopropyltriethoxysilane and the like.

The silane coupling agent should be selected so that it is suitable for any organic material in the coating vehicle which will be combined with the pigment at the time of its use. When the organic material is a polyester, the organo functional group preferably comprises a methacryl group. When it is a urethane, an amino functional coupling agent is preferred. For acrylic vehicles, the aminoethyl, aminopropyl, methacryloxypropyl, and glycidoxypropyl trimethoxy silanes are suitable. Often, best results occur with combination of amino and non-amino coupling agents.

The pigment is treated with the silane coupling agent by dry or wet mixing. For instance, an aqueous solution of the agent in water or a mixture of water and an organic solvent can be added to an aqueous slurry of the pigment. The silane is preferably prehydrolyzed such as, for instance, by stirring the coupling agent in water for a suitable period of time. It is also possible to effect hydrolysis at the time of mixing. In general, about 0.1 to 5 wt %, preferably about 0.25 to 2.5 wt %, of the silane coupling agent is used based on 100 parts by weight of pigment being treated. The coupling agent and pigment are combined for a period of time sufficient to allow reaction to occur, which may last from a few minutes to several hours or more, preferably about 0.5 to 10 hours. Thereafter the treated pigment can be recovered in the conventional fashion such as by filtration, centrifugation and the like, and dried.

In order to further illustrate the invention, various examples are set forth below. In these examples, as through this specification and claims, all parts and percentages are by weight and all temperatures are in degrees centigrade unless otherwise indicated.

EXAMPLE 1

An aqueous slurry was prepared by suspending 10 grams of an anatase titanium dioxide-coated mica commercial product in water. About 93 milliliters of a 1 molar silver nitrate solution was added slowly to the suspension with stirring and after about an hour, the mixture was poured onto an evaporating dish and stirring continued to allow water to slowly evaporate. After several hours, very low heat was applied in order to complete evaporation of the water. The resulting solid was then dried in an oven at 100° C. and calcined at temperatures ranging from 425° C. to 650° C. The resulting product was found to have a volume resistivity of about $5.1 \times 10^5$ Ω·cm. FIG. 1 is a scanning electron micrograph of the calcined product. Small aggregates of metallic crystallites covering the platelet surface are evident.

EXAMPLE 2

Figure 2:
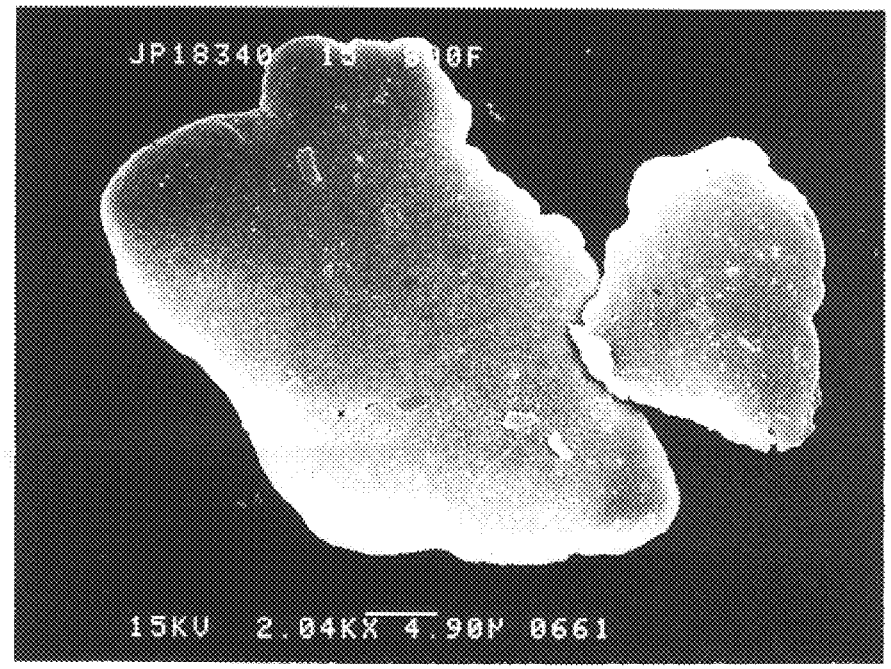
FIG. 2 is a photomicrograph of the surface of a pearlescent pigment formed in Example 2 below.

Example 1 was repeated except that about 0.78 grams of a rhodium nitrate solution (9.6% Rh in nitric acid) was added to the silver nitrate containing suspension. FIG. 2 is a scanning electron micrograph of the calcined product. The surface is smooth and continuous and there is no evidence of metal aggregates. The product had a volume resistivity of about $3.0 \times 10^5$ Ω·cm and has improved specular characteristics compared to example 1.

EXAMPLE 3

Example 2 was repeated except that the suspension contained about 5 grams of the titanium dioxide-coated mica, the amount of the silver nitrate solution was 90 ml and the amount of the rhodium nitrate solution was about 1 gram. The product, after being calcined at 650° C., had a volume resistivity of about 1.1 χ·cm. The surface is smooth and continuous and there is no evidence of metal aggregates.

EXAMPLE 4

Example 3 was repeated except that 5 micron particle size mica was used in place of the titanium dioxide-coated mica. After calcining at 650° C., the product had a volume resistivity of about 0.1 χ·cm. The surface was determined by scanning electron microscope inspection to be smooth and continuous and there is no evidence of metal aggregates.

EXAMPLE 5

A charge of 98 grams of the product of Example 1 is added to a 2 liter Morton flask equipped with a Teflon agitator paddle, heating mantle, pH electrode/meter and temperature probe/controller. Then, 666 milliliters of water are added and the resulting slurry is stirred at 300 rpm and heated to 78° C. The slurry pH is 9.7. A solution containing 0.63 grams of cerium nitrate hexahydrate, 1.99 grams of aluminum nitrate nonahydrate and 100 ml of water is added to the slurry at a rate of 1.6 ml/minute. The pH is allowed to drop to 6.5 and then maintained at the value by addition of appropriate amounts of a 3.5% sodium hydroxide solution. After completion of the introduction of the aqueous solution, the slurry is stirred for 1 hour and then 2 grams of glycidoxypropyltrimethoxysilane is added at a rate of 0.1 ml/minute followed by the addition 2 grams of γ-aminopropyltriethoxysilane at the same rate. The pH rises to 8.8 and then is maintained at a value above 8 for 1 hour with stirring. The product is filtered from the slurry and washed several times with water. The resulting press cake is then transferred to a glass tray and dried at 120° C. for 2 hours.

EXAMPLE 6

A charge of 110 grams of the product of Example 2 is added to a 2 liter Morton flask equipped with a Teflon agitator paddle, heating mantle, pH electrode/meter and temperature probe/controller. Then, 733 milliliters of water are added and the resulting slurry stirred at 300 rpm and heated to 78° C. The slurry pH is 8.8. A solution containing 0.69 grams of cerium nitrate hexahydrate, 2.19 grams of aluminum nitrate nonahydrate and 110 ml of water is added to the slurry at a rate of 1.7 ml/minute. The pH is allowed to drop to 6.5 then maintained at that value by addition of appropriate amounts of a 3.5% sodium hydroxide solution. After completion of the introduction of the aqueous solution, the slurry is stirred for 15 minutes and then 2.2 grams of glycidoxypropyltrimethoxysilane added at a rate of 0.1 ml/minute followed by the addition 2 grams of γ-aminopropyltriethoxysilane at the same rate. The pH rises to 8.8 and then maintained at a value above 8 for 1 hour with stirring. The product is filtered from the slurry and washed several times with water. The resulting presscake is then transferred to a glass tray and dried at 120° C. for 2 hours.

EXAMPLE 7

A charge of 98 grams of the product of Example 3 is added to a 2 liter Morton flask equipped with a Teflon agitator paddle, heating mantle, pH electrode/meter and temperature probe/controller. Then, 666 milliliters of water are added and the resulting slurry stirred at 300 rpm and heated to 78° C. The slurry pH is 8.1. A solution containing 0.63 grams of cerium nitrate hexahydrate, 1.99 grams of aluminum nitrate nonahydrate and 100 ml of water is added to the slurry at a rate of 1.6 ml/minute. The pH is allowed to drop to 6.5 and then maintained at the value by addition of appropriate amounts of a 3.5% sodium hydroxide solution. After completion of the introduction of the aqueous solution, the slurry is stirred for 15 minutes and then 2 grams of glycidoxypropyltriethoxysilane added at a rate of 0.1 ml/minute followed by the addition 2 grams of γ-aminopropyltrimethoxysilane at the same rate. The pH rises to 9.1 and then maintained at a value above 8 for 1 hour with stirring. The product is filtered from the slurry and washed several times with water. The resulting presscake is then transferred to a glass tray and dried at 120° C. for 2 hours.

EXAMPLE 8

About 1 gram of 5 micron particle size mica was placed in a flask. A solution prepared by combining 15 ml of water with 5.6 ml of a 1 molar silver nitrate solution was added slowly with stirring. After about 1 hour, the mixture was poured into an evaporating dish and stirring continued to allow the water to slowly evaporate. After several hours, very low heat was applied to achieve full evaporation of the water. The resulting solid was dried in an oven at about 100° C. and then calcined at about 530° C.

A charge of 200 grams of the product is added to a 3 liter Morton flask equipped with a Teflon agitator paddle, heating mantle, pH electrode/meter and temperature probe/controller. Then, 1330 milliliters of water are added and the resulting slurry stirred at 300 rpm and heated to 78° C. The slurry pH is 8.8. A solution containing 0.63 grams of cerium nitrate hexahydrate, 1.99 grams of aluminum nitrate non-ahydrate and 100 ml of water is added to the slurry at a rate of 1.6 ml/minute. The pH is allowed to drop to 6.5 and then maintained at the value by addition of appropriate amounts of a 3.5% sodium hydroxide solution. After completion of the introduction of the aqueous solution, the slurry is stirred for 15 minutes and then 2 grams of glycidoxypropyltriethoxysilane added at a rate of 0.1 ml/minute followed by the addition 2 grams of γ-aminopropyltriethoxysilane at the same rate. The pH rises to 8.8 and then maintained at a value above 8 for 1 hour with stirring. The product is filtered from the slurry and washed several times with water. The resulting presscake is then transferred to a glass tray and dried at 120° C. for 2 hours.

EXAMPLES 9–10

A complexed $HAuCl_4$ solution was prepared by mixing 0.3 moles of adipic acid and 0.6 moles of sodium hydroxide pellets, each dissolved in 100 ml of distilled water. To this solution was added 0.76 moles of NaOH pellets dissolved in 100 ml of distilled water. The resulting solution was nearly saturated and then added was an HCl stabilized $HAuCl_4$ solution containing 39.7% Au by weight and homogenized to a clear, yellow solution. A charge of 2.28 grams of 103 micron glass flakes, which had been cleaned with a chromic acid solution and then rinsed free of acid with water, were placed in a container and the complex $HAuCl_4$ solution added. A charge of 80 milliliters of methanol were added and the slurry was stirred vigorously while heating to 100° C. The slurry proceeded through several changes of color until after approximately 20 minutes, the reaction appeared complete in that the supernatant liquid was clear and colorless. The slurry was vacuum filtered, the presscake rinsed free of solutes with water and then dried to constant weight in a 100° C. oven. A yield of 4.07 grams of gold covered glass flakes was obtained. Examination by both optical and electron microscopy reveal that the gold layer was composed of relatively large crystallites.

The foregoing procedure is repeated except that an aqueous solution of rhodium nitrate is added to the glass-complex $HAuCl_4$ slurry for the purpose of making the gold coating more smooth and continuous.

EXAMPLES 11–12

Separately, a charge of 98 grams of the product of Examples 9–10 is added to a 2 liter Morton flask equipped with a Teflon agitator paddle, heating mantle, pH electrode/meter and temperature probe/controller. Then, 666 milliliters of water are added and the resulting slurry stirred at 300 rpm and heated to 78° C. A solution containing 0.63 grams of cerium nitrate hexahydrate, 1.99 grams of aluminum nitrate nonahydrate and 100 ml of water is added to the slurry at a rate of 1.6 ml/minute. The pH is allowed to drop to 6.5 and then maintained at the value by addition of appropriate amounts of a 3.5% sodium hydroxide solution. After completion of the introduction of the aqueous solution, the slurry is stirred for 1 hour and then 2 grams of glycidoxypropyltrimethoxysilane is added at a rate of 0.1 ml/minute followed by the addition 2 grams of γaminopropyltriethoxysilane at the same rate. The pH is maintained at a value above 8 for 1 hour with stirring. The product is filtered from the slurry and washed several times with water. The resulting presscake is then transferred to a glass tray and dried at 120° C. for 2 hours.

Various changes and modifications can be made to the present invention with departing from the spirit and scope thereof. The various embodiments which were set forth herein were intended to further illustrate the invention but were not intended to limit it.

What is claimed is:

1. A coated laminar substrate in which the coating comprises silver or gold wherein (a) the coating contains rhodium in an amount of up to about 2% by weight of the coating, (b) the coating is overcoated with a silane in an amount of up to about 5 weight percent based on the weight of the coating or (c) the coating contains rhodium in an amount of up to about 2% by weight of the coating and the coating is overcoated with a silane in an amount of up to about 5 weight percent based on the weight of the coating.

2. The coated laminar substrate of claim 1 wherein the amount of rhodium is about 0.5 to 1% by weight and the amount of the silane is about 0.1 to 5% by weight.

3. The coated laminar substrate of claim 1 wherein the laminar substrate is mica, glass or a metal oxide-coated mica.

4. The coated laminar substrate of claim 1 wherein the coating comprises silver.

5. The coated laminar substrate of claim 1 wherein the coating comprises gold.

6. The coated laminar substrate of claim 1 wherein the coating contains rhodium and is not overcoated with a silane.

7. The coated laminar substrate of claim 1 wherein the coating is overcoated with a silane and does not contain rhodium.

8. The coated laminar substrate of claim 1 wherein the coating contains rhodium and is overcoated with a silane.

9. A method of forming coated laminar substrate comprising forming a coating which comprises silver or gold on a laminar substrate and (a) causing said coating to contain rhodium in an amount of up to about 2% by weight of the coating, (b) overcoating said coating with a silane in an amount of up to about 5 weight percent based on the weight of the coating or (c) causing said coating to contain rhodium in an amount of up to about 2% by weight of the coating and overcoating said coating with a silane in an amount of up to about 5 weight percent based on the weight of the coating.

10. The method of forming a coated laminar substrate of claim 9 wherein the amount of rhodium is controlled to about 0.5 to 1% by weight and the amount of the silane is controlled to about 0.1 to 5% by weight.

11. The method of forming a coated laminar substrate of claim 9 wherein the laminar substrate is mica, glass or a metal oxide-coated mica.

12. The method of forming a coated laminar substrate of claim 9 wherein the coating comprises silver.

13. The method of forming a coated laminar substrate of claim 9 wherein the coating comprises gold.

14. The method of forming a coated laminar substrate of claim 9 wherein the coating contains rhodium and is not overcoated with a silane.

15. The method of forming a coated laminar substrate of claim 9 wherein the coating is overcoated with a silane and does not contain rhodium.

16. The method of forming a coated laminar substrate of claim 9 wherein the coating contains rhodium and is overcoated with a silane.

17. In a cosmetic containing a coloring agent, utilizing the coated laminar substrate of claim 1 as the coloring agent.

18. The cosmetic of claim 17 in which the laminar substrate is glass.

19. In a coating composition containing a coloring agent, utilizing the coated laminar substrate of claim 1 as the coloring agent.

20. The coated laminar substrate of claim 4 wherein the laminar substrate is glass.

\* \* \* \* \*